Aug. 28, 1951 L. D. CHRISTIE, JR., ET AL 2,566,117
REFRACTORY HEAT TRANSFER BODIES
AND PROCESS OF MANUFACTURE
Filed June 14, 1947
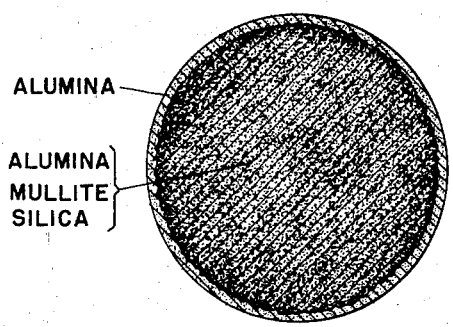
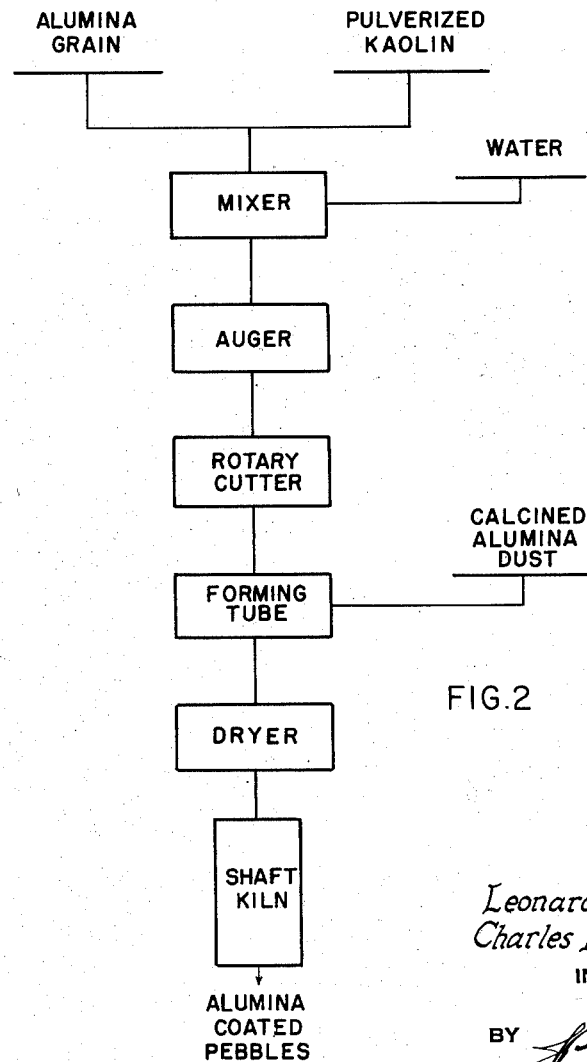
Leonard D. Christie, Jr.
Charles L. Norton, Jr.
INVENTORS
BY
ATTORNEY Patented Aug. 28, 1951

2,566,117

UNITED STATES PATENT OFFICE 2,566,117

REFRACTORY HEAT TRANSFER BODIES AND PROCESS OF MANUFACTURE

Leonard D. Christie, Jr., Yonkers, and Charles L. Norton, Jr., New York, N. Y., assignors to The Babcock & Wilcox Company, Rockleigh, N. J., a corporation of New Jersey Application June 14, 1947, Serial No. 754,764

9 Claims. (Cl. 117—100)

1

The present invention relates to the composition of high temperature refractory heat transfer bodies and a method of manufacturing the same, and more particularly, to heat transfer bodies of a type adapted for use as a moving heat transfer medium in fluid heaters of the general character disclosed in an application of E. G. Bailey et al., Serial No. 502,580, filed September 16, 1943, now U. S. Patent No. 2,447,306, in which a moving gas pervious mass or column of fluent refractory bodies is first heated by the passage of a heating gas in heat transfer relation therewith and then cooled by contact with one or more fluids to be heated, such apparatus usually comprising superposed heating and cooling chambers connected by a throat passage of reduced flow area. The heat transfer bodies continuously or substantially continuously move downwardly through the heating and cooling chambers and are recirculated therethrough in periodic cycles by external material transfer provisions.

The composition and structure of the heat transfer bodies are highly important and will mainly depend upon the operating conditions to which the bodies will be subjected, and particularly the range of operating temperatures, the character of the heating and heated fluids, and the desired pressure, fluid flow velocities and heat transfer efficiency conditions to be maintained. It is essential that the materials used should be of a refractory character suitable to withstand the wide range of temperatures which the bodies will encounter in normal operation without spalling or cracking. The bodies are desirably of substantially uniform size and shape to maintain substantially uniform fluid flow passages through the mass, and consequently a substantially uniform fluid flow and heat transfer effect throughout the cross-section of each chamber. The shape of the refractory bodies should be conducive to a rapid movement thereof, and the refractory composition used should be free of constituents which would tend to fuse in the normal operating temperature range and cause the bodies to agglomerate and thus obstruct the material movement. Where high rates of heat transfer are desired, the refractory materials used should have a high specific heat and a high thermal conductivity. A relatively high density

2 is also desirable to permit the use of refractory bodies of a size that will allow a relatively high fluid velocity through each chamber and a high heat capacity for the fluent mass of bodies therein, while preventing lifting and carryover of the bodies with the outgoing fluids.

The general object of this invention is the provision of a refractory heat transfer body having a high resistance to thermal shock and abrasion without excessive spalling and cracking, a high fusion temperature, and a relatively high density, and an economic method of manufacturing the same. A further and more specific object is the provision of a heat transfer body of the character described having a high specific heat and a high thermal conductivity. Another specific object of the invention is the provision of a heat transfer body of the character described made substantially entirely of alumina and alumina-silica refractory materials and having by chemical analysis an alumina ($Al_2O_3$) content in the range of 45–85% and a silica content in the range of 15–55% by weight. Another specific object is the provision of a refractory heat transfer body of the character described having an outer skin of greater refractoriness and hardness than the remaining portion of the body.

Of the drawings,

Fig. 1 is a somewhat diagrammatic sectional view of a heat transfer pebble made in accordance with the invention; and Fig. 2 is a flow diagram of the process of manufacture.

In accordance with the invention, the refractory heat transfer bodies are made substantially spherical in shape and range in size from ¼" to 1" in diameter, the size used mainly depending upon the desired rate of heat transfer to be maintained. Such refractory bodies or pebbles are intended for maximum service use temperatures in the range of 2500–3000° F., and in apparatus of the character referred to will be subjected to fluid temperatures ranging from slightly below their maximum use temperature to as low as 300° F. in each operating cycle. The pebbles are made in general of a composition of high temperature refractory grog and a high temperature bonding material or materials, with a small amount of one or more organic binders to provide desirable green strength for the molded pebbles, to secure a fired product having by chemical analysis an alumina content in the range of 45–85% by weight. The grog preferably consists mainly of a fused or sintered alumina grain and comprises approximately 60–70% by weight of the composition. The bond consists of pulverized kaolinic clay alone or with the addition of a fine-grained alumina, and comprises approximately 30–40% by weight of the composition. A small amount of a suitable green strength organic binder, such as dextrine, is included in the composition. Mixing of the dry materials described plus the addition and mixing of a quantity of water amounting to 10–20% of the weight of dry materials, provides a plastic extrudable mix suitable for the manufacture of pebbles of the character described.

While in its broader aspects the invention is applicable to the production of refractory pebbles having an alumina content in the range 45–72%, such as pebbles having the following chemical analysis:

| | Per cent by weight |
|---|---|
| Alumina ($Al_2O_3$) | 45.1 |
| Silica ($SiO_2$) | 51.9 |
| Titania ($TiO_2$) | 1.7 |
| Iron oxide ($Fe_2O_3$) | 1.4 |
| Alkali and alkaline earth | 0.3 | the preferred portion of the alumina range is an alumina percentage insuring a preponderance of mullite and/or corundum crystals in the fired pebbles, i. e. a chemical analysis in which the alumina content will be at least 72% by weight.

With compositions in the higher alumina range there is likely to be an excess of alumina over the amount combining with the free silica to form mullite, which excess tends to combine with the titania and iron oxide present to absorb the latter impurities. A representative mix for mullite pebbles having a chemical analysis showing 72% $Al_2O_3$ by weight after being fired would be:

*Formula A*

| | Per cent by weight |
|---|---|
| Electrically fused alumina grain | 41 |
| Electrically fused alumina grain (levigated) | 13 |
| Calcined Georgia kaolin—35 mesh | 9 |
| Pulverized raw Georgia kaolin | 35 |
| Bentonite | 1 |
| Dextrine | 1 |

The unlevigated alumina constituent is finely divided, about half being of No. 100 grit size and the remainder No. 220 grit size. This alumina is 94–96% $Al_2O_3$ and 0.6% $CaO$. The levigated alumina is 99% $Al_2O_3$. Other suitable plastic clays may be substituted for the bentonite and other organic binders for the dextrine. The dry materials are thoroughly mixed, and water to the extent of 10–20% by weight of the dry materials added and mixed.

A representative mix for a refractory pebble having a chemical analysis showing 82% alumina by weight after being fired would be:

*Formula B*

| | Per cent by weight |
|---|---|
| Electrically fused alumina grain | 67 |
| Pulverized raw Georgia kaolin | 31 |
| Bentonite | 1 |
| Dextrine | 1 |
| Water, 10–20% by weight of dry materials | |

The alumina grain in this formula is 99% $Al_2O_3$, and is equally divided between No. 60 grit size and No. 100F grit size. The constituents are blended as previously described to form an extrudable mix.

The preferred process of manufacturing pebbles in accordance with the invention is shown diagrammatically in Fig. 2 and involves the introduction of the mix into an auger of the deairing type and its extrusion through a square die. The extruded material is cut into cubes by a rotary type cutter and the severed cubes drop into an inclined rotary forming tube, the rotation of which tumbles the cubes and shapes the cubes into substantially spherical pebbles of the desired size. The green pebbles pass out of the lower end of the forming tube onto trays which are moved through a drying chamber at a temperature of 180–250° F. in which they are dried to a green strength sufficient to permit their handling. The green pebbles are then fired at a temperature of 2900–3100° F., i. e. to a temperature substantially above the mullite formation range, for approximately 5 hours in a vertical shaft kiln of the type disclosed in the copending application of Charles L. Norton, Serial No. 625,776, filed October 31, 1945, now Patent No. 2,512,442.

An advantageous feature of the process of manufacture is the introduction into the forming tube at its cube inlet end of a finely divided (through 100 mesh screen) high temperature aluminum compound such as aluminum oxide or calcined aluminum hydroxide. The aluminum compound dust acts as a parting agent on the pebbles in the forming tube and the mechanical working given to the cubes to form the spherical pebbles aids in the formation of a thin coating of the parting agent on the pebbles. When aluminum hydroxide is employed for this purpose, this material burns to alumina in the subsequent high temperature firing operation. The coating is tightly bonded to each pebble by the high temperature firing operation, and the coating is kneaded into the body of the pebble to such an extent that the coating will be intact after the abrasion and rubbing encountered in the trip through the shaft kiln. As indicated in Fig. 1, the high temperature firing produces a thin tightly bonded skin of alumina over the entire outer surface of the pebble, which substantially increases the refractoriness of the finished pebbles.

The resulting pebbles have a clear white surface color with a dark interior and a fine texture throughout. The grog grain size used and the mixing and firing operations are regulated to secure a predetermined porosity in the range of 15–30% for the pebble structure. This appears to give a certain flexibility to the pebble structure which enables the pebbles to withstand thermal shock. During the firing operation and in use, some of the alumina coating combines with any free silica in the adjacent interior to form mullite crystals. The excess silica in the kaolin bond also progressively combines with some of the alumina grains to progressively increase the mullite content of the pebble during the initial firing and subsequent heating operations. The resulting pebble thus has an alumina skin with a hardness of approximately 9 on the Moh scale with an alumina-mullite-silica interior having an approximate hardness of 7.5. It was also found advantageous in the pebble forming operation to circulate previously fired pebbles through the forming tube in contact with the pebbles being shaped.

The physical properties of fired pebbles made from the foregoing mix formulae when tested were found to be as follows:

|  | Pebbles of Formula A Mix | | Pebbles of Formula B Mix | |
| --- | --- | --- | --- | --- |
| Nominal Size | 5/16" | 1/2" | 5/16" | 1/2" |
| 1  Chemical Analysis (Per cent by weight): | | | | |
| $Al_2O_3$ | 72.9 | | 82.9 | |
| $SiO_2$ | 23.1 | | 15.3 | |
| $TiO_2$ | 2.1 | | 0.6 | |
| $Fe_2O_3$ | 0.7 | | 0.4 | |
| Alkaline and Alkaline Earth | 0.6 | | 0.9 | |
| 2  Packed Density, lbs./cu. ft. | 88–93 | | 90–95 | |
| 3  Specific Gravity | 3.16 | | 3.40 | |
| 4  Porosity, Per Cent | 26±1 | | 29±1 | |
| 5  Water Absorption, Per Cent | 11.5±1 | | 12±1 | |
| 6  Temperature Use Limit, F. | 2,850 | | 3,000 | |
| 7  Surface Area, sq. ft./cu. ft. | 135.5 | 86.5 | 135.5 | 86.5 |
| 8  Surface Area, sq. ft./lb. | 1.50 | 0.96 | 1.47 | 0.94 |
| 9  No. Pebbles/cu. ft. | 63,600 | 15,900 | 63,600 | 15,900 |
| 10  No. Pebbles/lb. | 706 | 177 | 691 | 173 |

Abrasion and spalling tests for the above pebbles were carried out in an air heater of the type shown in said copending Bailey et al. patent, with the following results:

|  | Pebbles of Formula A Mix | Pebbles of Formula B Mix |
| --- | --- | --- |
| Pebble Rate, lb./hr | 800 | 800 |
| Combustion Air, lb./hr | 500 | 500 |
| Process Air, lb./hr | 620 | 620 |
| Furnace Temp. F | 2,600 | 2,600 |
| Process Air F | 1,550 | 1,460 |
| Flue Gas Exit F | 340 | 350 |
| Pebble Outlet F | 240 | 290 |
| Hours of Operation | 24 | 24 |
| Weight of Pebbles, In, lb | 382 | 447 |
| Weight of Pebbles, Out, lb | 373 | 446 |
| Abrasion Loss, lb | 2.9 | 1.0 |
| Abrasion Loss, Per Cent | 0.76 | 0.22 |
| Per Cent Splits, actual from examination | 2.0 | 0.2 |

All of the pebbles had excellent strength as evidenced by their low abrasion and impact losses, and good crushing strength.

The use of an alumina pebble coating was also found advantageous in the firing of the dried pebbles by increasing the allowable firing temperature without encountering any tendency for the pebbles to stick or fuse together in the high temperature zone of the shaft kiln. This advantage was present not only with the mullite and high alumina pebbles, but also with the lower alumina kaolin base pebbles.

The refractory pebbles made as described are particularly suitable for use as moving heat transfer bodies. The smooth alumina surface facilitates their movement and minimizes the abrasion losses. The high specific heat (0.25–0.30) and thermal conductivity of the constituent materials affords excellent heat transfer conditions. The internal vitrified fine textured structure of alumina, mullite and free silica forms a strong porous body resistant to spalling and cracking. This internal structure coupled with the tightly bonded alumina skin permits service use temperatures well above the maximum temperatures ordinarily required for the fluids to be heated. These physical properties are advantageously attained with mix formulae including a substantial percentage of cheap kaolin in lieu of highly expensive fused alumina grain.

What is claimed is:

1. The process of manufacturing refractory heat transfer bodies which comprises forming a plastic mix containing 60–70% by weight of grog consisting mainly of high alumina grain and 30–40% by weight of a bond of pulverized raw kaolin and water in an amount 10–20% of the weight of dry materials, forming the mix into small rounded bodies, and firing the bodies to a vitrifying temperature at least in the mullite formation range.

2. The process of manufacturing fluent refractory heat transfer bodies which comprises forming an extrudable mix containing 50–70% fused alumina grain and 25–45% kaolin, extruding the mix, cutting the extruded mix into pieces of predetermined size, shaping the severed pieces into substantially spherical pebbles, drying the fluent pebbles formed, and firing the dried pebbles until a vitrified pebble structure having an alumina content of 72–85% by weight is formed.

3. The process of manufacturing refractory heat transfer bodies which comprises forming an extrudable mix containing substantial amounts of fused alumina grain and kaolin, shaping the mix into rounded bodies while in contact with an aluminum compound dust, drying the bodies formed, and firing the dried bodies until a vitrified structure having an alumina content of 45–85% by weight and an alumina coating bonded thereto is obtained.

4. The process of manufacturing fluent refractory heat transfer bodies which comprises forming an extrudable mix containing substantial amounts of fused alumina grain and kaolin, extruding the mix, cutting the extruded mix into pieces of predetermined size, shaping the severed pieces into substantially spherical pebbles while in contact with an aluminum compound dust, drying the fluent pebbles formed, and firing the dried pebbles until a vitrified pebble structure having an alumina content of 45–85% by weight and an alumina coating bonded thereto is formed.

5. The process of manufacturing fluent refractory heat transfer bodies which comprises forming an extrudable mix containing 50–70% fused alumina grain and 25–45% kaolin, extruding the mix, cutting the extruded mix into pieces of predetermined size, shaping the severed pieces into substantially spherical pebbles while in contact with an aluminum compound dust, drying the fluent pebbles formed, and firing the dried pebbles to a maximum temperature approximating 3000° F. until a vitrified pebble structure having an alumina content of 72–85% by weight and an alumina coating bonded thereto is obtained.

6. As a new article of manufacture, a refractory heat transfer body having a rounded shape and a vitrified internal structure consisting of alumina, mullite and silica and a thin skin of relatively pure alumina tightly bonded to the internal structure.

7. As a new article of manufacture, a refractory heat transfer body having a rounded shape and a vitrified porous internal structure consisting of alumina, mullite and silica and a thin skin of relatively pure alumina tightly bonded to the internal structure, said bodies having a porosity ranging from 15–30% and a fusion temperature above 2500° F.

8. As a new article of manufacture, a fluent refractory heat transfer body having a substantially spherical shape and a vitrified internal structure consisting of alumina, mullite and silica with the alumina content in the range of 72–85% by weight and a skin of relatively pure alumina tightly bonded to the internal structure, said bodies having a fusion temperature above 2900° F.

9. As a new article of manufacture, a fluent refractory heat transfer body having a substantially spherical shape and a fine textured vitrified porous internal structure consisting of alumina, mullite and silica with the alumina content in the range of 72–85% by weight and a thin skin of relatively pure alumina tightly bonded to the internal structure, said bodies having a porosity ranging from 15–30% and a fusion temperature above 2900° F.

LEONARD D. CHRISTIE, Jr.
CHARLES L. NORTON, Jr.

REFERENCES CITED

The following references are of record in the file of this patent:

UNITED STATES PATENTS

| Number | Name | Date |
|---|---|---|
| 784,621 | Klein | Mar. 14, 1905 |
| 855,379 | Bangs | May 28, 1907 |
| 1,527,874 | Hood | Feb. 24, 1925 |
| 1,802,296 | Willetts | Apr. 21, 1931 |
| 2,015,381 | Harding | Sept. 24, 1935 |
| 2,017,056 | Easter | Oct. 15, 1935 |
| 2,035,845 | Stanton | Mar. 31, 1936 |
| 2,136,096 | Benner et al. | Nov. 8, 1938 |
| 2,316,726 | Spicer et al. | Apr. 13, 1943 |

FOREIGN PATENTS

| Number | Country | Date |
|---|---|---|
| 266,751 | Great Britain | 1928 |
| 370,864 | Great Britain | 1930 |